(12) United States Patent
Taniguchi et al.

(10) Patent No.: US 12,134,385 B2
(45) Date of Patent: Nov. 5, 2024

(54) DRIVING SUPPORT DEVICE

(71) Applicant: Mitsubishi Electric Corporation, Tokyo (JP)

(72) Inventors: Takuya Taniguchi, Tokyo (JP); Noritaka Kokido, Tokyo (JP); Masahiro Yata, Tokyo (JP); Kenta Onishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 412 days.

(21) Appl. No.: 16/969,284

(22) PCT Filed: Apr. 5, 2018

(86) PCT No.: PCT/JP2018/014600
§ 371 (c)(1),
(2) Date: Aug. 12, 2020

(87) PCT Pub. No.: WO2019/193715
PCT Pub. Date: Oct. 10, 2019

(65) Prior Publication Data
US 2021/0009135 A1    Jan. 14, 2021

(51) Int. Cl.
*B60K 35/28* (2024.01)
*B60K 35/60* (2024.01)
(Continued)

(52) U.S. Cl.
CPC ......... *B60W 30/18163* (2013.01); *B60R 1/26* (2022.01); *B60R 1/27* (2022.01);
(Continued)

(58) Field of Classification Search
CPC ........... B60W 30/18163; B60W 50/14; B60W 2050/146; B60W 2420/42;
(Continued)

(56) References Cited

U.S. PATENT DOCUMENTS

2001/0040505 A1  11/2001  Ishida et al.
2006/0167620 A1*  7/2006  Takagi ............... G08G 1/161
                                                    701/519
(Continued)

FOREIGN PATENT DOCUMENTS

JP    2002-46506 A    2/2002
JP    2006-185295 A    7/2006
(Continued)

OTHER PUBLICATIONS

Communication dated Nov. 24, 2021, issued by the Japanese Patent Office in application No. 2020-512185.
(Continued)

*Primary Examiner* — Abby Y Lin
*Assistant Examiner* — Hossam M Abd El Latif
(74) *Attorney, Agent, or Firm* — Sughrue Mion, PLLC; Richard C. Turner

(57) ABSTRACT

A driving support device wherein an own vehicle and a peripheral vehicle are symbolized, and relative dispositions are displayed in real time in a display unit visible to the driver, is obtained to facilitate a lane change by a driver. The driving support device includes a vehicle detecting unit, which detects peripheral vehicles positioned in a periphery of a vehicle, and an image generating unit, which generates an image representing positions of the vehicle and the peripheral vehicles from vehicle information obtained by the vehicle detecting unit. The image generating unit generates a driving support image including vehicle information representing relative dispositions of the vehicle and the peripheral vehicles using symbols indicating the vehicle and the peripheral vehicles. The image generating unit includes an image stacking unit, which generates original data of the driving support image, and an image control unit, which cuts a necessary portion from the original data.

14 Claims, 10 Drawing Sheets

(51) Int. Cl.
  *B60R 1/26* (2022.01)
  *B60R 1/27* (2022.01)
  *B60W 30/18* (2012.01)
  *B60W 50/14* (2020.01)
  *G01C 21/26* (2006.01)
  *G08G 1/16* (2006.01)

(52) U.S. Cl.
  CPC ....... *B60W 50/14* (2013.01); *B60W 2050/146* (2013.01); *B60W 2420/403* (2013.01); *B60W 2552/53* (2020.02); *B60W 2554/4041* (2020.02)

(58) Field of Classification Search
  CPC ...... B60W 2552/53; B60W 2554/4041; B60K 2370/178; B60K 2370/779; B60R 2300/607; B60R 1/00; G01C 21/26; G08G 1/16
  USPC .............................................................. 701/1
  See application file for complete search history.

(56) References Cited

U.S. PATENT DOCUMENTS

| | | | | |
|---|---|---|---|---|
| 2011/0293145 | A1* | 12/2011 | Nogami | G08G 1/166 |
| | | | | 382/103 |
| 2015/0314783 | A1* | 11/2015 | Nespolo | B60W 30/095 |
| | | | | 701/301 |
| 2016/0339840 | A1* | 11/2016 | Stefan | G08G 1/04 |
| 2017/0088053 | A1* | 3/2017 | Orellana | B60R 1/08 |
| 2017/0096105 | A1* | 4/2017 | Israelsson | G08G 1/163 |
| 2017/0187963 | A1* | 6/2017 | Lee | G02B 27/01 |
| 2017/0336797 | A1* | 11/2017 | Abe | G02B 27/0179 |
| 2017/0341647 | A1* | 11/2017 | Rajvanshi | B60W 60/00274 |
| 2017/0349173 | A1* | 12/2017 | Nishiguchi | B60W 60/00 |
| 2018/0001894 | A1* | 1/2018 | Masui | B60W 10/18 |
| 2019/0219820 | A1* | 7/2019 | Hirakawa | G02B 27/0101 |

FOREIGN PATENT DOCUMENTS

| | | | |
|---|---|---|---|
| JP | 2006185296 A | | 7/2006 |
| JP | 2015-011458 A | | 1/2015 |
| JP | 2017151547 A | * | 8/2017 |
| JP | 2017-191472 A | | 10/2017 |
| JP | 2017-211700 A | | 11/2017 |
| WO | 2010/122747 A1 | | 10/2010 |

OTHER PUBLICATIONS

International Search Report for PCT/JP2018/014600, dated May 29, 2018.
Communication dated Jan. 29, 2022 from the Chinese Patent Office in Chinese Application No. 201880092062.6.
Communication dated Jul. 13, 2021, from the Japanese Patent Office in application No. 2020-512185.
Communication dated Sep. 27, 2022 from the Chinese Patent Office in Chinese Application No. 201880092062.6.
Office Action issued Mar. 21, 2023 in Chinese Application No. 201880092062.6.
Chinese Office Action dated Aug. 22, 2023 in Application No. 201880092062.6.
Hermann Winner, et al."Driver Assistance Systems Manual", Springer Vieweg, 3rd edition, 2015, (104 pages).
German Office Action dated Sep. 6, 2024 in Application No. 11 2018 007 432.3.

* cited by examiner

DRIVING SUPPORT DEVICE

CROSS REFERENCE TO RELATED APPLICATIONS

This application is a National Stage of International Application No. PCT/JP2018/014600 filed Apr. 5, 2018.

BACKGROUND OF THE INVENTION

1. Field of the Invention

The present application relates to a driving support device that provides information for carrying out a lane change safely to a driver who drives a vehicle.

2. Description of the Related Art

A vehicle information providing device that detects a situation in a periphery of an own vehicle using radar or the like when a lane of the own vehicle is changed to a neighboring lane, indicates whether a lane change can be carried out and how much time remains in which the lane change can be carried out, and shows a distribution of the own vehicle and a peripheral vehicle on an image of rectangles in a three-by-three matrix, has been disclosed as existing technology (for example, refer to Patent Literature 1).

Patent Literature JP-A-2015-11458

The existing vehicle information providing device is such that a driver has to assess intuitively whether a determination by the device is appropriate, whether a lane change can be completed within a proposed time, and the like, and there are cases in which changing lane smoothly is difficult.

Also, a display of the image of rectangles in a matrix that shows the distribution of the own vehicle and the peripheral vehicle is such that when the own vehicle is allotted a rectangle positioned in a center of the three-by-three matrix, the display only shows which of the remaining rectangles the peripheral vehicle is allotted to, that is, only a distinction between a left-right direction and a front-back direction with respect to the own vehicle. Because of this, there is a problem in that even when the driver refers to the image of rectangles in a matrix, he or she cannot visually recognize the actual relative positions of the own vehicle and the peripheral vehicle accurately.

SUMMARY OF THE INVENTION

The present application discloses technology for resolving the aforementioned kind of problem, and has an object of providing a driving support device that shows a driving support image wherein a driver can visually recognize accurate relative dispositions of an own vehicle and a peripheral vehicle in real time.

A driving, support device disclosed in the present application is mounted in a vehicle, and includes a vehicle detecting unit that detects peripheral vehicles positioned in a periphery of the vehicle, an image generating unit that generates an image representing dispositions of the vehicle and the peripheral vehicles from, information obtained by the vehicle detecting unit, and a display unit, provided in a place visually recognizable to a driver who drives the vehicle, in which the image is displayed, wherein the image generating unit generates the image to include vehicle information representing relative dispositions of the vehicle and the peripheral vehicles using symbols indicating each of the vehicle and the peripheral vehicles.

According to the driving support device disclosed in the present application, accurate relative dispositions of an own vehicle and a peripheral vehicle are displayed using symbols in real time in a driving support image displayed in, a display unit. Because of this, a driver can accurately ascertain a relative positional relationship between the own vehicle and the peripheral vehicle by confirming dispositions of the symbols, and can safely carry out driving such as a lane change.

The foregoing and other objects, features, aspects, and advantages of the present application will become more apparent from the following detailed description of the present application when taken in conjunction with the accompanying drawings.

DETAILED DESCRIPTION OF THE PREFERRED EMBODIMENTS

First Embodiment

Figure 1:
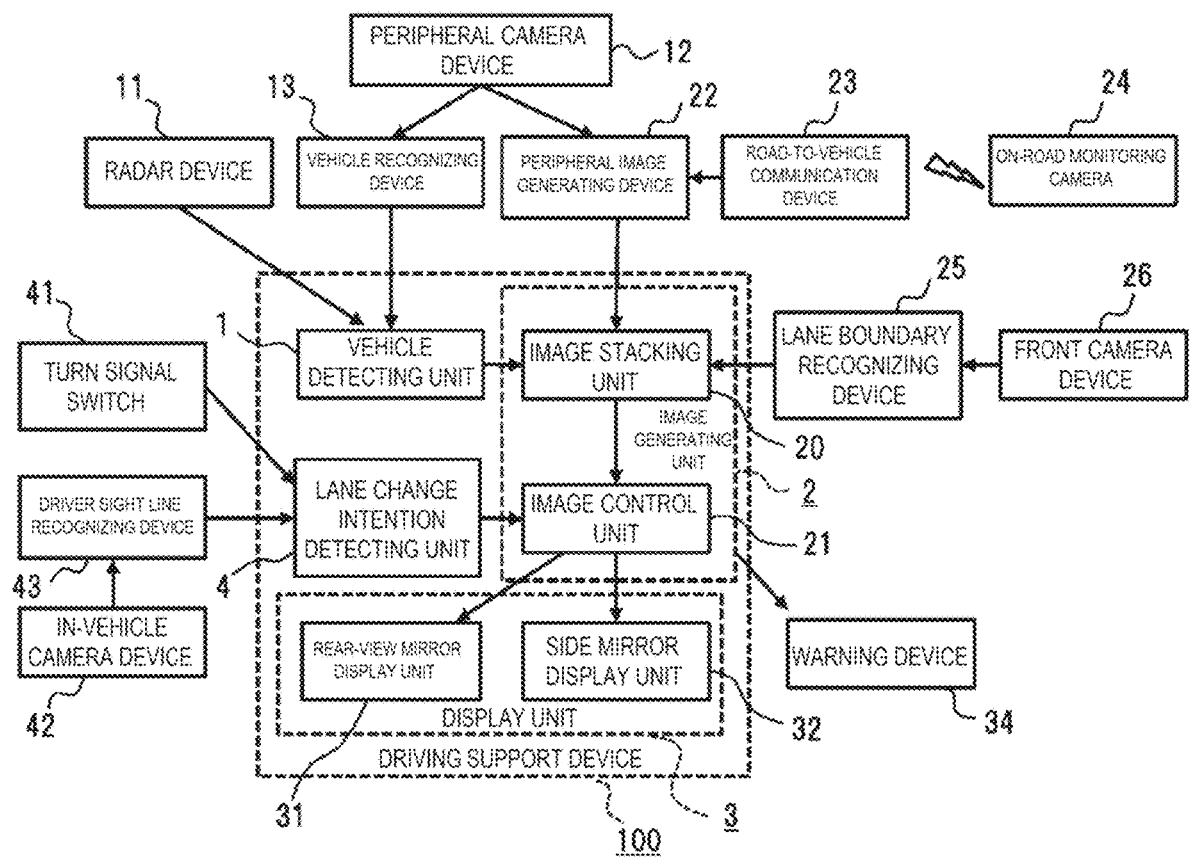
FIG. 1 is a configuration diagram of a driving support device according to a first embodiment.

FIG. 1 is a configuration diagram showing a driving support device 100 according to a first embodiment, and is a drawing showing a relationship between data transfers between the driving support device 100, which is mounted in a vehicle (an own vehicle) driven by a driver, a device already existing in the vehicle, a camera installed on a road or the like, and the like.

The driving support device 100 is a device for providing information useful to a driver when the driver carries out a lane change by showing information regarding relative dispositions of the own vehicle and a peripheral vehicle on a screen.

As shown in FIG. 1, the driving support device 100 includes a vehicle detecting unit 1 that detects a peripheral vehicle positioned in a periphery of the own vehicle, an image generating unit 2 that imports vehicle information detected by the vehicle detecting unit 1, and generates a driving support image that shows a relative positional relationship between the own vehicle and the peripheral vehicle from above, a display unit 3 in which an image generated by the image generating unit 2 is displayed, and a lane change intention detecting unit 4 for determining whether or not the driver intends to change lane. As an alternative to utilizing a display already existing in the vehicle as the display unit 3, a dedicated display screen can be used by installing the display screen in a place visually recognizable to the driver.

The vehicle detecting unit 1 obtains information regarding a peripheral vehicle (vehicle information) from a radar device 11 and a vehicle recognizing device 13, and excludes duplicated data, thus obtaining vehicle information with no misrecognition. The radar device 11 is an already existing device mounted in the vehicle, and is a device that obtains information regarding a distance from the own vehicle to a target object (peripheral vehicle), and a direction to the target object, using, for example, a reflection of an emitted electromagnetic wave. The vehicle recognizing device 13 is a device that detects a peripheral vehicle from an image of the periphery of the own vehicle obtained using a peripheral camera device 12 mounted on the vehicle.

A peripheral image obtained by the peripheral camera device 12 is, for example, an overhead image, called a surround view, such that a camera image is modified so as to be seen looking from above.

Also, an already existing device mounted in the vehicle can be utilized as the vehicle recognizing device 13, but when the vehicle recognizing device 13 is not mounted in the vehicle as an already existing device, the vehicle recognizing device 13 can be provided as one portion of constituent components of the driving support device 100 of the present application.

The image generating unit 2 implements a process of stacking images based on, for example, vehicle information, peripheral image information, and lane information, and includes, as main constituent components, an image stacking unit 20 that generates original data of a driving support image to be output to the display unit 3, and an image control unit 21 that cuts only a necessary portion out of original data generated by the image stacking unit 20, and outputs the necessary portion to the display unit 3.

The image stacking device 20 receives vehicle information from the vehicle detecting unit 1, peripheral image information from a peripheral image generating device 22, and lane information from a lane boundary recognizing device 25, and generates original data by stacking all the information. The peripheral image generating device 22 receives filmed data from an on-road monitoring camera 24 via a road-to-vehicle communication device 23, in addition to data filmed by the peripheral camera device 12, and generates an image of the periphery of the own vehicle (an image of a background visible on either side of a road). For example, the peripheral image can be represented using an overhead view.

Herein, an overhead view refers to a view looking down on a road from an upper side. Further, the overhead view can be modified to the kind of deformed view that accentuates a on that should be focused on. Further, a driving support image may be generated by combining differing display methods as appropriate, such as a kind of representation wherein a road portion is represented in a planar manner so as to be looked down on immediately below and a kind of representation (a surround view) showing a wider range than a normal view wherein scenery in a periphery of the road (a peripheral image) is looked down on obliquely below.

Data filmed by a front camera device 26 mounted on a front of the vehicle are imported into the lane boundary recognizing device 25, lane information showing lane boundaries positioned at either end of a lane in which the vehicle is traveling is generated, and the lane information is transmitted to the image stacking unit 20.

The image control unit 21 is a processing unit (trimming unit) that cuts only a necessary portion out from original data c generated by the image staking unit 20, receives information that the lane change intention detecting unit 4 has determined that the driver intends to change lane to the left (or the right), cuts out an image of a region centered on the left side (or the right side), including the own vehicle, from the original data, and transmits the image data to the display unit 3.

Herein, the lane change intention detecting unit 4, which detects the existence or otherwise of an intention of the driver to change lane and a direction of a lane change, determines, based on an output signal (lane change information) from a turn signal switch 41, that the driver intends to attempt to change lane to a neighboring lane on the left side (or the right side) when the driver activates a turn signal on the left (or the right) and a direction indicator in that direction flashes.

In addition to a trimming process of cutting out an image of the direction in which the driver is attempting to change lane, the image control unit 21 can carry out various processes that aid visual recognition by the driver, such as changing a peripheral vehicle positioned in the direction in which the driver is attempting to change lane to a design such that the peripheral vehicle stands out more (is accentuated).

Also, in addition to lane change information from the turn signal switch 41, the lane change intention detecting unit 4 can also obtain lane change information by the driver being filmed by an in-vehicle camera device 42, and a driver image obtained being analyzed by a driver sight line recognizing device 43.

In this case, the driver's sight line is recognized by the driver sight line recognizing device 43, and when the driver's sight line focuses on a left or right side mirror, the lane change intention detecting unit 4 determines that there is an intention to change lane to the left or the right. In this way, the lane change intention detecting unit 4 can obtain lane change information based on the driver's sight line.

Original data of a driving support image including all information, such as vehicle information showing a relative disposition of a vehicle, peripheral image information showing an image of a vehicle periphery, and lane information showing a position of a lane boundary line, are generated by the image generating unit 2, and a driving support image wherein a display region is optimized is generated by extracting a portion necessary to the driver from the original data.

Therefore, by visually recognizing a driving support image displayed in the display unit 3 before shifting to a lane changing action, the driver can easily ascertain a situation such as in which position in the periphery of the own vehicle a vehicle to beware of exists.

Also, the driving support device 100 is configured in such a way that when a vehicle to beware of with which there is a possibility of colliding appears, a signal is transmitted from the image generating unit 2 to a warning device 34 mounted in the vehicle, and an audio display, or a warning display in various kinds of display unit, is carried out.

In addition to issuing a warning, the warning device 34 can be used as a driving support audio guide device, and when it is detected by the image generating unit 2 that a timing is such that no vehicle to beware of exists, and a lane change can be carried out safely, the warning device 34 can also issue a message such as "You can change lane".

The display unit 3 is provided in a place visually recognizable to the driver driving the vehicle. For example, a rear-view mirror display unit 31 or a side mirror display unit 32 may be disposed in a mirror face portion of a rear-view mirror 310 or a side mirror 320 visually recognized by the driver when changing lane, and adopted as the display unit 3.

Herein, as an alternative to using the rear-view mirror 310 or the side mirror 320 having an image display function and already existing n the vehicle, and using one portion of a display screen thereof as the display unit 3, that is, the rear-view mirror display unit 31 or the side mirror display unit 32, of the driving support device 100, a flat display screen forming the rear-view mirror display unit 31 or the side mirror display unit 32 may be used by being affixed as a retrofit to the already existing rear-view mirror 310 or side mirror 320 that does not have an image display function.

It goes without saying that by using a display screen with a transparent background (with high transparency) as a retrofitted display screen, a driving support image does not occupy one portion of the mirror face at a timing wherein the driving support image is not displayed, and a check behind can be carried out using the whole of the mirror face effectively.

Also, the display unit 3 can also be provided in a place other than the rear-view mirror 310 or the side mirror 320 visually recognizable to the driver (a rim, an audio device, or the like), and a display can also be carried out by affixing a display screen to an inner face of a windshield, or by causing a driving support image to be projected toward the windshield.

Provided that a form of the display unit 3 is such that a driving support image obtained using the image generating unit 2 can be displayed, it goes without saying that the display method is not limiting to the heretofore described display method, and that another display method can be adopted.

Figure 2:
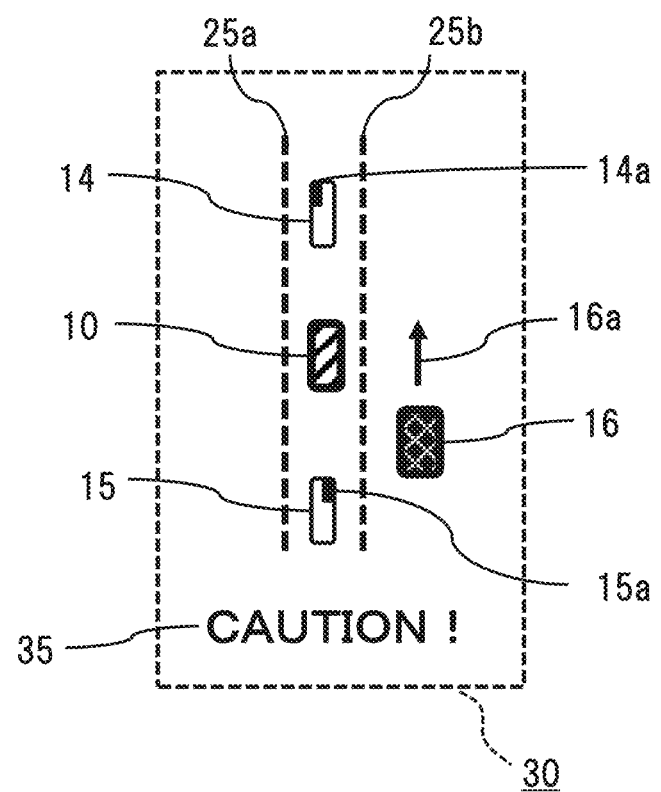
FIG. 2 is a drawing showing an example of a driving support image to be shown in a display unit of the driving support device.

FIG. 2 shows an example of a driving support image 30 generated by the image generating unit 2, wherein the example of FIG. 2 shows a state wherein a multiple of lanes having the same direction of travel (an upward direction in the drawing) are seen looking down from above, and a multiple of peripheral vehicles 14, 15, and 16 are traveling in a region centered on an own vehicle 10. The own vehicle 10 driven by the driver and the peripheral vehicles 14, 15, and 16 are displayed as symbols, and a state wherein the symbols are disposed in accordance with relative dispositions of the vehicles is shown in the driving support image 30. Further, lane boundary lines 25a and 25b that form boundary lines with neighboring lanes are displayed on either side of a cruising lane.

In the example of FIG. 2, the peripheral vehicle 14 is traveling ahead in the same lane as the own vehicle 10, and a turn signal display portion 14a is superimposed on the symbol indicating the vehicle, indicating that there is an intention to change lane to the left. The peripheral vehicle 15 is traveling behind in the same lane as the own vehicle 10, and a turn signal display portion 15a superimposed on the symbol thereof is indicating that there is an intention to change lane to the right. The peripheral vehicle 16 is traveling in a neighboring lane neighboring on the right side of the lane in which the own vehicle 10 is traveling, and a state wherein the peripheral vehicle 16 is nearing the own vehicle 10 from behind is shown.

Further, the driver driving the own vehicle 10 has an intention to change lane to the right-side lane, and of the peripheral vehicles 14, 15, and 16, the peripheral vehicle 16, which is traveling in the lane on the right side of the own vehicle 10 and approaching the own vehicle 10 at a predetermined speed (for example, a speed such that the peripheral vehicle 16 will catch up with the own vehicle 10 within three seconds) or greater, is seen as a vehicle to beware of (a vehicle with which there is a possibility of colliding), and the symbol indicating the peripheral vehicle 16 is displayed with a color or a shape, or both the color and the shape, accentuated.

For example, the peripheral vehicle 16, which is a vehicle to beware of, can be accentuated by the symbol being filled in (or being displayed brightly by changing the contrast), the symbols of the other peripheral vehicles 14 and 15 can be shown in outline only, and an outline of the symbol of the own vehicle 10 can be accentuated by being rendered thicker, or the like. In addition, distinguishing between the displayed symbols can be supported by color coding.

By adopting a method whereby only a vehicle to beware of among the peripheral vehicles is displayed as a symbol in the driving support image 30, and other symbols are not displayed, the vehicle to beware of can be displayed accentuated more than other peripheral vehicles.

Herein, with a vehicle being a vehicle that is nearing the own vehicle and is predicted to catch up with the own vehicle within three seconds being set as a condition, a vehicle among peripheral vehicles positioned in the periphery of the own vehicle that fulfills the condition is classified as a vehicle to beware of with which there is a possibility of colliding, and a vehicle that does not fulfill the condition is classified as a vehicle with which there is no possibility of colliding.

Among vehicles traveling in the same direction of travel in a lane neighboring the lane in which the own vehicle is traveling, a peripheral vehicle that is in a situation of traveling behind the own vehicle at a speed higher than that of the own vehicle and about to catch up with the own vehicle, and a peripheral vehicle that is in a situation of traveling ahead of the own vehicle at a speed lower than that of the own vehicle and about to be caught by the own vehicle correspond to a peripheral vehicle that is nearing the own vehicle.

Furthermore, in the example of FIG. 2, relative direction of movement of the peripheral vehicle 16 with respect to the own vehicle 10 (movement direction information) is indicated by an arrow (a movement direction display portion 16a) in order to show that the peripheral vehicle 16, which is a vehicle to beware of, is approaching the own vehicle 10 from behind and creating a dangerous situation. In the case of a vehicle to beware of, an orientation of the arrow is in a state indicating a position alongside the own vehicle.

Also, a magnitude of a relative speed between the own vehicle and the peripheral vehicle can be represented by a size of the displayed arrow (the movement direction display portion 16a).

Further, in order to make the driver aware of the existence of the peripheral vehicle 16, which is a vehicle to beware of, a warning display portion (a display such as "CAUTION !") is provided outside (for example, below) the region of the driving support image 30 in which the relative vehicle dispositions are shown.

Figure 3:
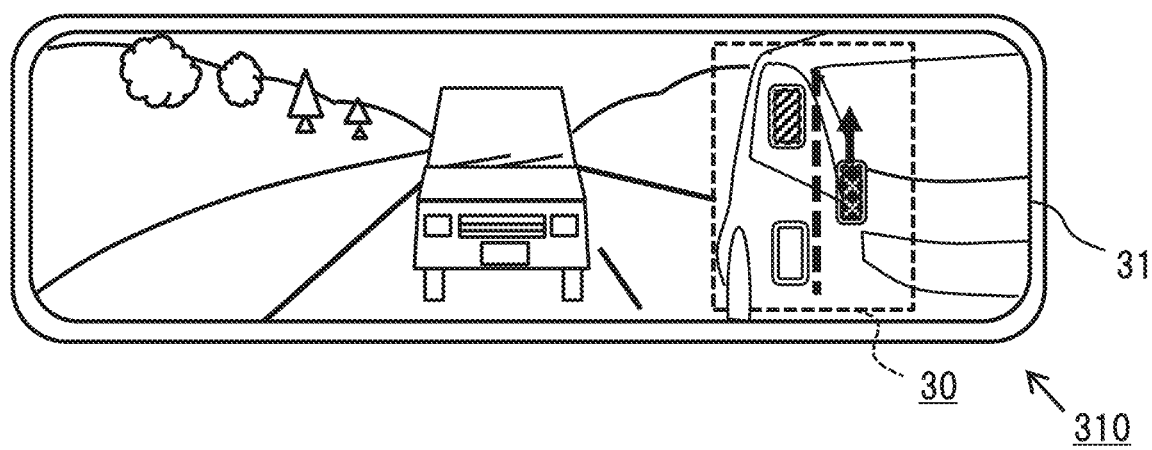
FIG. 3 is a front view of a rear-view mirror display unit.

The driving support image 30 shown in FIG. 2 can, for example, be displayed in one portion of the rear-view mirror display unit 31 forming the mirror face portion of the rear-view mirror 310, as shown in FIG. 3. In addition to the rear-view mirror 310 being used as a simple mirror for rearward visual recognition, in order to used the mirror face portion thereof as a display unit, a rear-view mirror of a configuration such that a display device is incorporated in advance can be applied. The display unit 3 can also be configured using a method whereby a flat display device is affixed and wired as a retrofit to the rear-view mirror 310, and the same configuration can be adopted for the side mirror display unit 32 provided in the side mirror 320, to be described hereafter.

Further, in the case of a right-hand drive (or left-hand drive) vehicle, a right side (or a left side) of the mirror face portion of the rear-view mirror 310 is used as the rear-view mirror display unit 31 of the display unit 3, as shown in FIG. 3, whereby a distance from the driver to the display unit 3 is not long, and visual recognition of the display unit 3 is facilitated.

Figure 4:
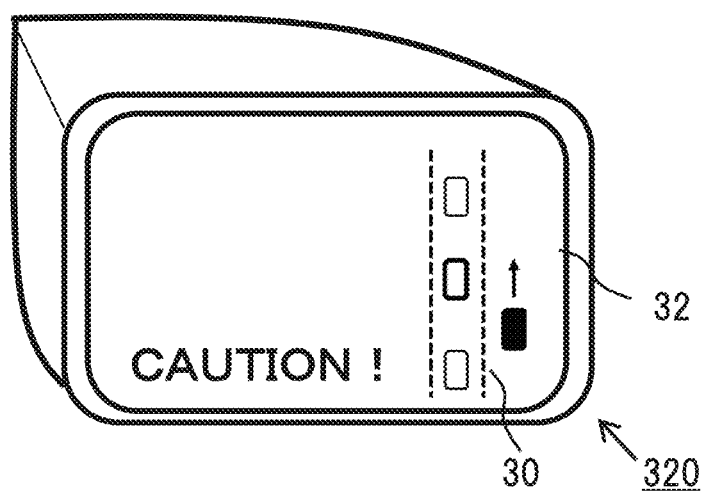
FIG. 4 is a perspective view of a side mirror display unit.

Also, the side mirror display unit 32 can be disposed in one portion of the mirror face portion of the side mirror 320, and the kind of driving support image 30 of FIG. 2 can be displayed therein, as shown in FIG. 4, and by causing the driving support image 30 to be displayed in the right-side (or left-side) side mirror 320 when the driver attempts to change lane to the right side (or the left side), visual recognition of the image by the driver is facilitated.

It goes without saying that the display unit 3 can be provided in both the rear-view mirror 310 and the side mirror 320, and the driving support image 30 can be displayed on the display screen of each thereof, and furthermore, a form such that the display unit 3 is additionally mounted in a place visually recognizable to the driver can also be adopted.

Figure 5:
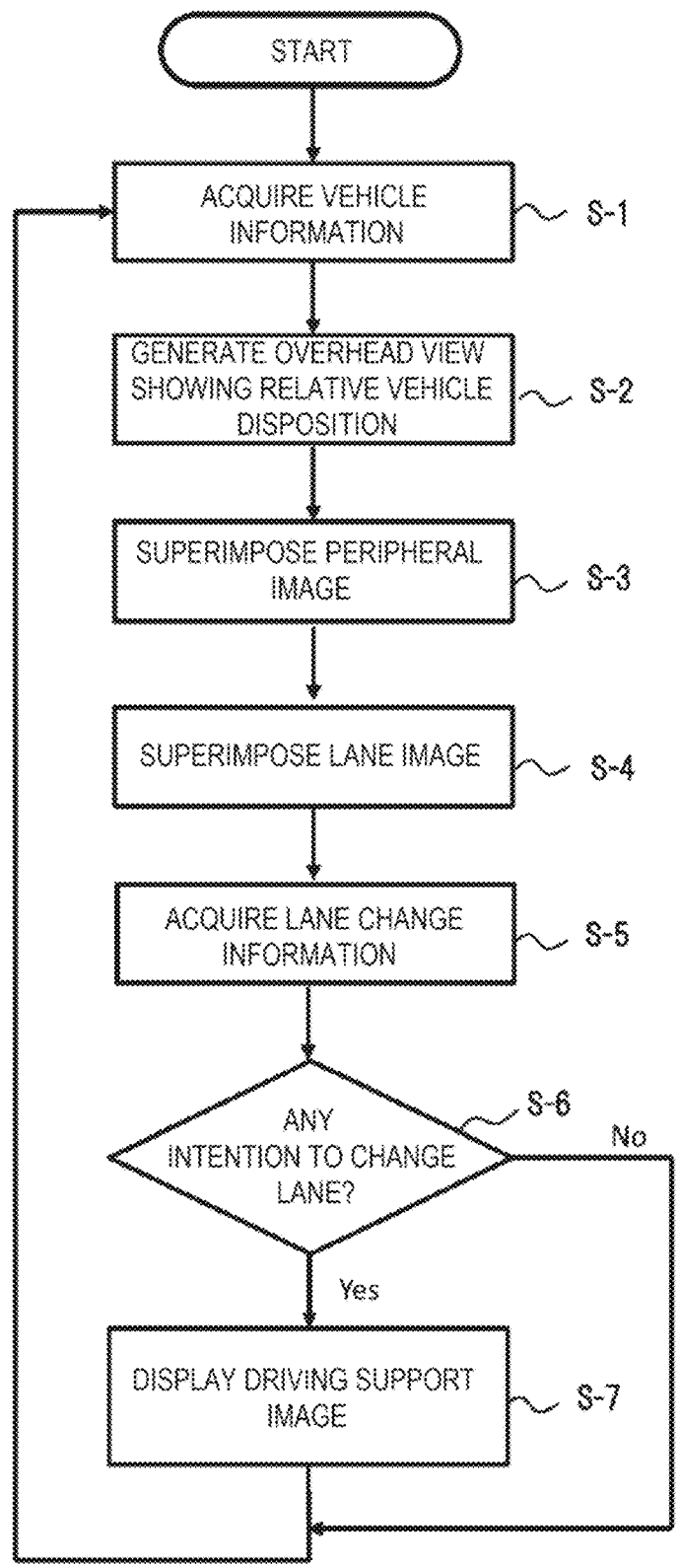
FIG. 5 is a flow diagram showing an operation of the driving support device.

Next, an operation of the driving support device 100 will be described using the flow diagram of FIG. 5. FIG. 5 is a flowchart showing a basic operation of the driving support device 100.

Firstly, peripheral vehicle detection information is gathered from the radar device 11 and the vehicle recognizing device 13, which detect a peripheral vehicle positioned in the periphery of the own vehicle, by the vehicle detecting unit 1, the information is analyzed, and vehicle information with no misrecognition is generated by duplicated data being excluded or the like. The vehicle information is transmitted to the image stacking unit 20 of the image generating unit 2 (step S-1 (acquire vehicle information)).

Next, a vehicle image (for example, an overhead view) from which a relative positional relationship between the own vehicle and a peripheral vehicle is understood is generated by the image stacking unit 20 configuring the image generating unit 2, based on the vehicle information acquired using the vehicle detecting unit 1 (step S-2 (generate overhead view showing relative vehicle disposition)).

Next, a peripheral image formed of, for example, an overhead view is generated by the peripheral image generating device 22 from an own vehicle periphery image filmed by the peripheral camera device 12, and the peripheral image (peripheral image information) is superimposed on the vehicle image showing relative vehicle disposition generated in step S-2 (step S-3 (superimpose peripheral image)). Herein, rather than actual images being superimposed one on the other, a state wherein items of information regarding the images are synthesized at the same coordinates is expressed as image stacking.

Continuing, lane information indicating a lane boundary position is acquired by the image stacking unit 20 from the lane boundary recognizing device 25, and a lane boundary line (a lane image) is superimposed on the image generated in step S-3 (step S-4 (superimpose lane image)).

Next, lane change information output from the turn signal switch 41 and the driver sight line recognizing device 43 is acquired by the lane change intention detecting unit 4 (step S-5 (acquire lane change information)), and whether or not the driver is attempting to change lane is determined based on the existence or otherwise of an intention to change lane (step S-6 (any intention to change lane?)).

When it is determined in step S-6 that there is an intention to change lane (Yes), a necessary portion only is cut out by the image control unit 21 from original data of the driving support image 30 acquired from the image stacking unit 20, the necessary portion is transmitted to either one or both of the rear-view mirror display unit 31 and the side mirror display unit 32 of the display unit 3, and the driving support image 30 after trimming is displayed (step S-7 (display driving support image)).

Also, when it is determined in step S-6 that there is no intention to change lane (No), no control processing the original data of the driving support image 30 is carried out, and no display thereof is carried out.

Further, returning to step S-1, the controls of steps S-1 to S-7 are repeated. By regulating the repetition cycle, and continuously updating to the latest image, an accurate relative vehicle disposition can be displayed in the display unit 3 in real time.

The driving support device 100 is such that when there is a vehicle with which there is a possibility of colliding when, for example, the driver changes lane to the right, a display of the driving support image 30 is carried out on the right-side side mirror, as shown in FIG. 4, and the driver can easily and accurately ascertain the positions of the own vehicle and a peripheral vehicle traveling n the neighboring lane to which the driver intends to change.

Next, a configuration and an operation of the vehicle detecting unit 1 configuring the driving support device 100 will be described in more detail.

The radar device 11, which detects a peripheral vehicle existing in the periphery of the own vehicle by measuring a reflected wave, and the vehicle recognizing unit 13, which uses an image recognition process to recognize a peripheral vehicle from a peripheral image acquired from the peripheral camera device 12 wherein the periphery of the own vehicle has been filmed, are connected to the vehicle detecting unit 1. The vehicle detecting unit 1 acquires two items of vehicle information obtained using differing detection methods and, after carrying out a necessary data processing, transmits the obtained vehicle information to the image stacking unit 20 of the image generating unit 2.

At this time, when both the radar device 11 and the vehicle recognizing device 13 redundantly detect the same peripheral vehicle, a countermeasure such that one item of data is deleted to avoid a data duplication can be adopted, so that no misrecognition is caused in the image generating unit 2 at a subsequent stage.

Figure 6:
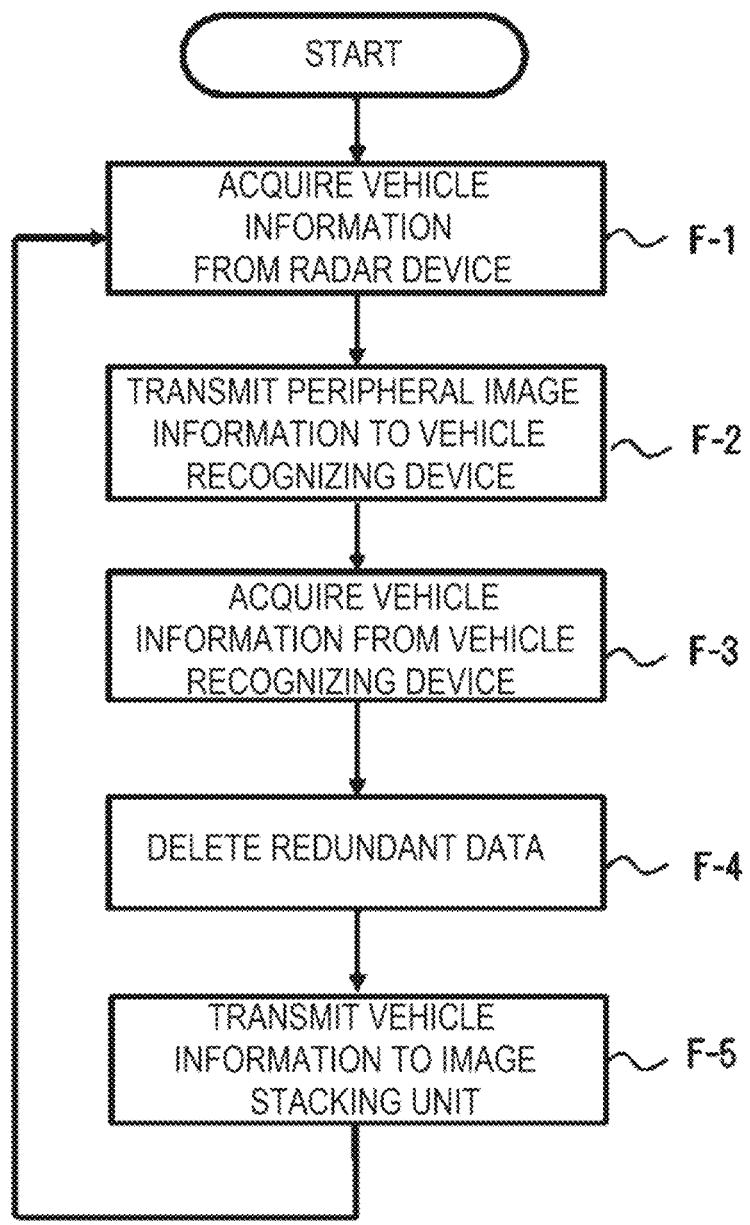
FIG. 6 is a flow diagram showing an operation of a vehicle detecting unit.

FIG. 6, being a flow diagram showing an operation of the vehicle detecting unit 1, is a flowchart relating to a detection of a peripheral vehicle positioned in the periphery of the own vehicle.

When an operation of the vehicle detecting unit 1 is started, firstly, the vehicle detecting unit 1 acquires vehicle information from the radar device 11. The radar device 11 is, for example, a device already existing in the vehicle. The radar device 11 can detect a position and a size of a target object using a reflected wave, detects a peripheral vehicle positioned in the periphery of the own vehicle, and transmits vehicle information obtained by the detection to the vehicle detecting unit 1 (step F-1 (acquire vehicle information from radar device)).

Next, the vehicle detecting unit 1 acquires vehicle information from the vehicle recognizing device 13. The vehicle recognizing device 13 is, for example, a device already existing in the vehicle. Further, data analyzed by the vehicle recognizing device 13 is an image of the periphery of the own vehicle filmed by the peripheral camera device 12, which is also a device already existing in the vehicle. Peripheral images obtained by the peripheral camera device 12 are periodically transmitted to the vehicle recognizing device 13 (step F-2 (transmit peripheral image information to vehicle recognizing device)).

Continuing, a peripheral image obtained by the peripheral camera device 12 is analyzed by the vehicle recognizing device 13, a peripheral vehicle positioned in the periphery of the own vehicle is detected, and vehicle information indicating a disposition and the like of the obtained peripheral vehicle is transmitted to the vehicle detecting unit 1 (step F-3 (acquire vehicle information from vehicle recognizing device)).

Next, the two kinds of vehicle information obtained from the radar device 11 and the vehicle recognizing device 13 are compared by the vehicle detecting unit 1, and only necessary information is extracted. That is, vehicle information among all the vehicle information wherein peripheral vehicle positions are duplicated is seen as vehicle information detected by both the radar device 11 and the vehicle recognizing device 13, and one of the items is deleted (step F-4 (delete redundant data)).

The vehicle information obtained in step F-4 is transmitted to the image stacking unit 20 of the image generating unit 2 (step F-5 (transmit vehicle information to image stacking unit)).

This series of operations (steps F-1 to F-5) is carried out repeatedly.

The items of vehicle information obtained in steps F-1 and F-2 both include information regarding the size of a peripheral vehicle that is a detection target. Therefore, by the size of a symbol eventually displayed in the display unit 3 in accordance with the size of the detected peripheral vehicle being changed in accordance with a vehicle category, the quality of information displayed to the driver can be improved.

In this case, taking the size of a symbol indicating an ordinary vehicle to be "medium", a symbol indicating a motorcycle, whose external form is smaller than that of an ordinary vehicle, can be expressed as "small", and a symbol indicating a large vehicle, whose external form is larger than that of an ordinary vehicle, can be expressed as "large".

Also, when the vehicle information obtained in steps F-1 and F-2 includes information regarding the color of a body of a peripheral vehicle that is a detection target, the color of a symbol eventually displayed in the display unit 3 can be the same as the color of the body of the peripheral vehicle (or a color corresponding thereto), whereby information with higher quality can be provided to the driver, and ascertaining of a situation can be supported.

Furthermore, when a flashing state of a turn signal of the peripheral vehicle is confirmed in step F-3 in the peripheral image obtained by the peripheral camera device 12, turn signal display information (the left-side or the right-side turn signal is flashing) can also be detected at the same time, and a process is carried out so as to include the turn signal display information in the detection details of the vehicle information.

Herein, information the driver should refer to when changing lane is shown in the driving support image 30 eventually displayed in the display unit 3, and at least a real time peripheral vehicle disposition is shown in the image.

A flow such that a shift is made to an acquisition of vehicle information from the vehicle recognizing device 13 (step F-3) in response to an acquisition of vehicle information from the radar device 11 (step F-1) is shown in the example of FIG. 6, but not being limited to a process that synchronizes cycles of data acquisition, and reliability of display details of a driving support image can be improved by carrying out a process so that the latest information can be transmitted to a subsequent stage, such as by repeating the process in accordance with the shorter cycle.

Next, a configuration and an operation of the image generating unit 2 configuring the driving support device 100 will be described in more detail. The image generating unit 2, which generates a driving support image to be displayed in the display unit 3, is of a configuration including two components, those being the image stacking unit 20 and the image control unit 21.

Further, the image stacking unit 20, starting with vehicle information acquired from the vehicle detecting unit 1, acquires peripheral image information acquired from the peripheral image generating device 22, which is a device already existing in the vehicle, acquires lane information indicating a position of a boundary line positioned between a cruising lane and a neighboring lane acquired from the lane boundary recognizing device 25, which is also a device already existing in the vehicle, and causes the images to be stacked, thereby generating original data of a driving support image. The original data of the driving support image are output to the image control unit 21, which is one constituent component of the image generating unit 2 (a configuration and an operation of the image control unit 21 will be described hereafter).

Herein, the peripheral image generating device 22 imports an image of the periphery of the own vehicle filmed by the peripheral camera device 12, and an image of the periphery of the own vehicle filmed by the on-road monitoring camera 24, which is provided on the road on which the vehicle is traveling, via the road-to-vehicle communication device 23, which already exists in the vehicle, generates peripheral image information showing the periphery of the own vehicle from above, and transmits the peripheral image information to the image stacking unit 20.

Furthermore, an image in the direction of travel of the vehicle filmed by the front camera device 26, which is a device already existing in the vehicle, is imported into the lane boundary recognizing device 25, and lane information is generated by the positions of lane boundary lines positioned on either side of the cruising lane being extracted from the image. Further, the lane information is transmitted to the image stacking unit 20.

Figure 7:
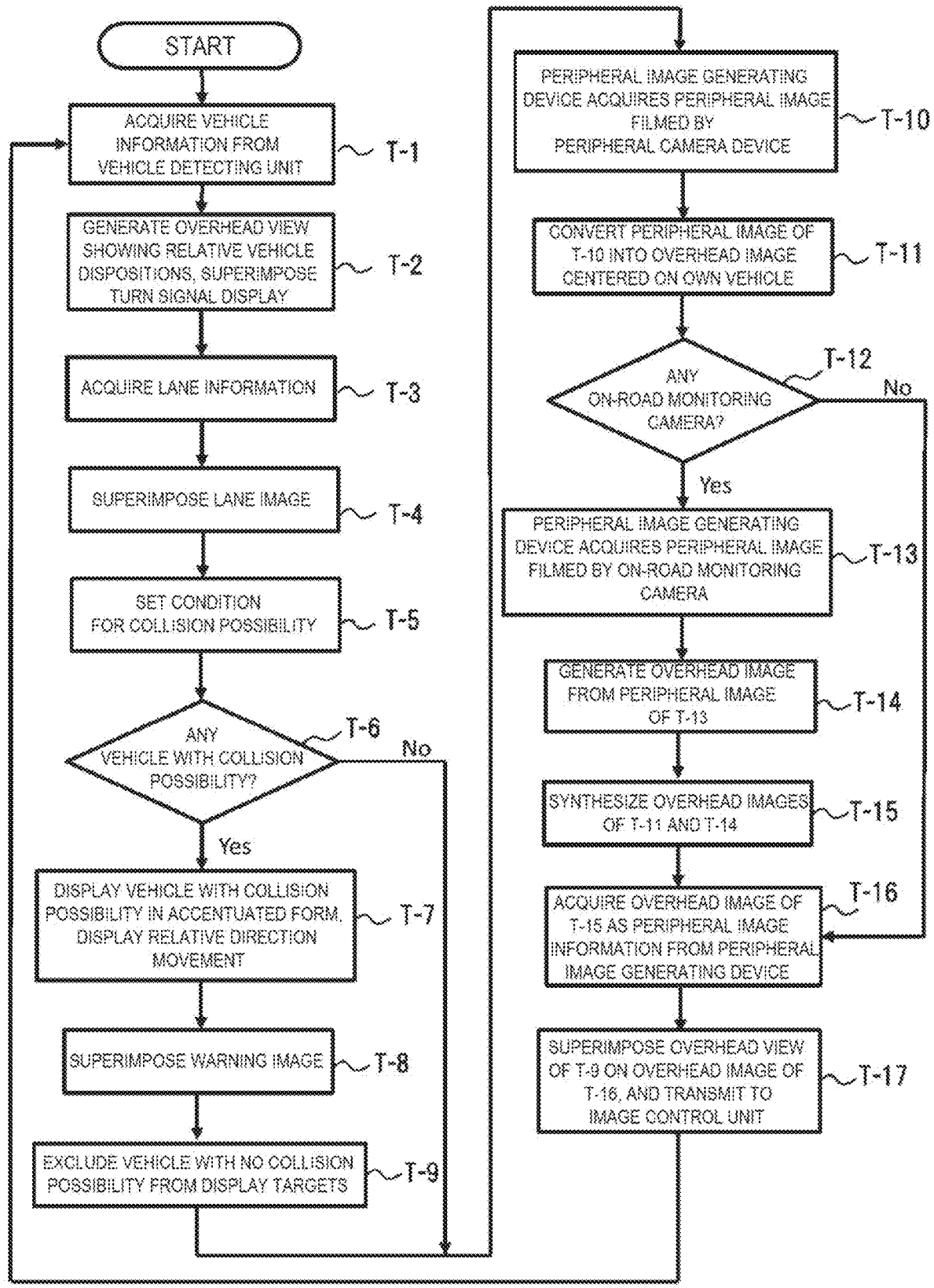
FIG. 7 is a flow diagram showing an operation of an image stacking unit that is a constituent component of an image generating unit.

FIG. 7 is a flow diagram showing an operation of the image stacking unit 20, and shows a flowchart of acquiring vehicle information, peripheral image information, and lane information, and stacking images based on these items of information, thereby generating original data of the driving support image 30.

The image stacking unit 20 receives information regarding a vehicle in the periphery of the own vehicle from the vehicle detecting unit 1 (step T-1 (acquire vehicle information from vehicle detecting unit)) and, based on information regarding the position of the peripheral vehicle, generates an overhead view (for example, FIG. 2) showing a relative position of the detected peripheral vehicle, centered on the position of the own vehicle. Herein, when turn signal flashing information is included in the vehicle information regarding the detected peripheral vehicle, the image stacking unit 20 additionally depicts information indicated by the turn signal (turn signal display information) on the symbol indicating the relevant vehicle in the overhead view showing the relative vehicle dispositions (step T-2 (generate overhead view showing relative vehicle dispositions, superimpose turn signal display)).

Next, the image stacking unit 20 acquires lane information indicating a lane boundary position from the lane boundary recognizing device 25, which uses image processing to recognize a lane boundary based on an image from the front camera device 26 (step T-3 (acquire lane information)).

Further, the image stacking unit 20 displays a line indicating a lane boundary position (a lane image) additionally superimposed on the overhead view generated in step T-2 (the image indicating relative vehicle dispositions) (step T-4 (superimpose lane image)).

Based on the vehicle information acquired in step T-1 and the lane information acquired in step T-3, the image stacking unit 20 assesses the existence or otherwise of a possibility of colliding with the peripheral vehicle from a relationship between the relative speeds of the own vehicle and the peripheral vehicle. For example, the image stacking unit 20 determines that a peripheral vehicle that is traveling behind in a lane neighboring the lane in which the own vehicle is traveling and nearing the own vehicle, and which will reach a position alongside the own vehicle within three seconds, is a vehicle with which there is a possibility of colliding (step T-5 (set condition for collision possibility)).

Further, the image stacking unit 20 determines whether or not there is a peripheral vehicle with which there is a possibility of colliding among peripheral vehicles obtained from the vehicle information (step T-6 (any vehicle with collision possibility?)).

In steps T-5 and T-6, the possibility of collision is assessed in accordance with whether or not the time needed for a peripheral vehicle to catch up with the own vehicle from behind is three seconds or less, but this is a time based on a road traffic act stating that a turn signal is to be activated three seconds in advance when changing lane while driving. This condition shows one example, and it goes without saying that the existence or otherwise of a possibility of colliding may be determined based on another criterion, such as by changing to a time other than three seconds, depending on the type of road being traveled on (a distinction between a general road and a freeway, or the like).

In the case of "Yes" in step T-6, that is, when a peripheral vehicle with which there is a possibility of colliding exist s in the periphery of the own vehicle, the image stacking unit 20 proceeds to step T-7, displays the symbol indicating the peripheral vehicle with which there is a possibility of colliding in an accentuated form, and displays an arrow indicating the relative direction of movement of the relevant vehicle (the relative direction of movement in the direction of travel in each lane) superimposed on the overhead view obtained in step T-4 (step T-7 (display vehicle with collision possibility in accentuated form, display relative movement direction)). In the case of "No" in step T-6, that is, when no peripheral vehicle with which there is a possibility of colliding exists, the image stacking unit 20 proceeds to step T-10, to be described hereafter.

Next, the image stacking unit 20 notifies the warning device 34, which is a device already existing in the vehicle, that a peripheral vehicle with which there is a possibility of colliding exists, causes an alarm to be issued, and simultaneously superimposes a message informing of a warning (a warning image), for example, "CAUTION !", on the overhead view obtained in step T-7 (T-8 (superimpose warning image)).

Herein, when the number of detected peripheral vehicles is large, and a large number of symbols should be displayed in the image, or the like, information regarding a peripheral vehicle with which there is no possibility of colliding is seen as unnecessary data, and can be excluded from display targets so that a vehicle with which there is no possibility of colliding is not displayed in the overhead image (step T-9 (exclude vehicle with no collision possibility from display targets)).

Next, the peripheral image generating device 22 acquires an image of the periphery of the own vehicle filmed by the peripheral camera device 12 (step T-10 (peripheral image generating device acquires peripheral image filmed peripheral camera device)).

Next, the peripheral image generating device 22 converts the peripheral image of T-10 into, for example, an overhead image centered on the own vehicle (step T-11 (convert peripheral image of T-10 into overhead image centered on own vehicle)).

Next, the peripheral image generating device 22 determines whether or not the on-road monitoring camera 24 is near the own vehicle (step T-12 (any on-road monitoring camera?)).

Herein, when the on-road monitoring camera 24 exists (in the case of "Yes" in step T-12), the peripheral image generating device 22 acquires an image of the periphery of the own vehicle filmed by the camera from the on-road monitoring camera 24 via the road-to-vehicle communication device 23 (step T-13 (peripheral image generating device acquires peripheral image filmed by on-road monitoring camera)).

When the on-road monitoring camera 24 does not exist (in the case of "No" in step T-12), the peripheral image generating device 22 proceeds to step T-16, to be described hereafter.

Next, the peripheral image generating device 22 modifies the peripheral image acquired from the on-road monitoring camera 24 in step T-13, thereby generating a peripheral image (for example, an overhead image) in which the vehicle periphery is looked out over (step T-14 (generate overhead image from peripheral image of T-13)).

Next, the peripheral image generating device 22 synthesizes the overhead image generated in step T-11 and the overhead image generated in step T-14 (step T-15 (synthesize overhead images of T-11 and T-14)), and transmits peripheral image information regarding the synthesized overhead image of step T-15 to the image stacking unit 20 (step T-16 (acquire overhead image of T-15 as peripheral image information from peripheral image generating device)).

Herein, by an overhead view generated from an image obtained by the peripheral camera device 12 and an overhead image generated from an image obtained by the on-road monitoring camera 24 being synthesized, information on ranges that have not been detected in any of the images before synthesizing is added the image after synthesizing, and the image after synthesizing can display a wider range of peripheral image information.

Next, the image stacking unit 20 superimposes the overhead image generated in step T-16 on the overhead view generated in step T-9, thereby generating original data of the driving support image 30, and transmits the original data to the image control unit 21 (step T-17 (superimpose overhead view of T-9 on overhead image of T-16, and transmit to image control unit)).

Next, a configuration and an operation of the image control unit 21 configuring the image generating unit 2 will be described in more detail. The image control unit 21 is configured so as to acquire original data of a driving support image generated by the image stacking unit 20 and, in accordance with an intention of the driver to change lane (an intention to change lane to the left side or the right side), generate image information in a display range appropriate as driving support by trimming only a necessary portion from the original data, and transmit the image information to the display unit 3.

As shown in FIG. 1, a configuration is such that the image stacking unit 20 and the lane change intention detecting unit 4 are connected to the image control unit 21, and the image control unit 21 acquires original data of the driving support image 30 and information regarding a detected lane change intention from the image stacking unit 20 and the lane change intention detecting unit 4 respectively.

Also, the image control unit 21 is connected to the display unit 3, in which the driving support image 30 after trimming is displayed. The display unit 3 is configured of, for example, the rear view mirror display unit 31 or the side mirror display unit 32, which have the mirror face portion of the rear view mirror 310 or the side mirror 320 of the vehicle as a display screen.

The display unit 3 is one portion of the constituent components of the driving support device 100, but when the display unit 3 (a display screen corresponding to the rear view mirror display unit 31 or the side mirror display unit 32) already exists in the vehicle, it is sufficient that the image generating unit 2 and the already existing display unit 3 are connected, and a driving support image is displayed interrupting an outermost face of the already existing display screen. That is, there is no need to newly provide a display screen forming the display unit 3 when mounting the driving support device 100 in the vehicle.

When the already existing rear view mirror 310 or side mirror 320 is configured of a simple mirror face member, the display unit 3 is disposed as a retrofit, thereby obtaining the driving support device 100.

Furthermore, as shown in FIG. 1, the warning device 34, which expresses a warning using acoustic means when a vehicle to beware of with which there is a possibility of colliding exists, is provided as an external configuration connected to the driving support device 100. Although a stereo unit or the like already existing in the vehicle can be utilized as the warning device 34, a dedicated warning device 34 of the driving support device 100 can also be newly mounted in the vehicle and used. When a vehicle to beware of exists among peripheral vehicles, a signal for causing an emission of a sound indicating a warning to the driver is output from the image generating unit 2 to the warning device 34.

Figure 8:
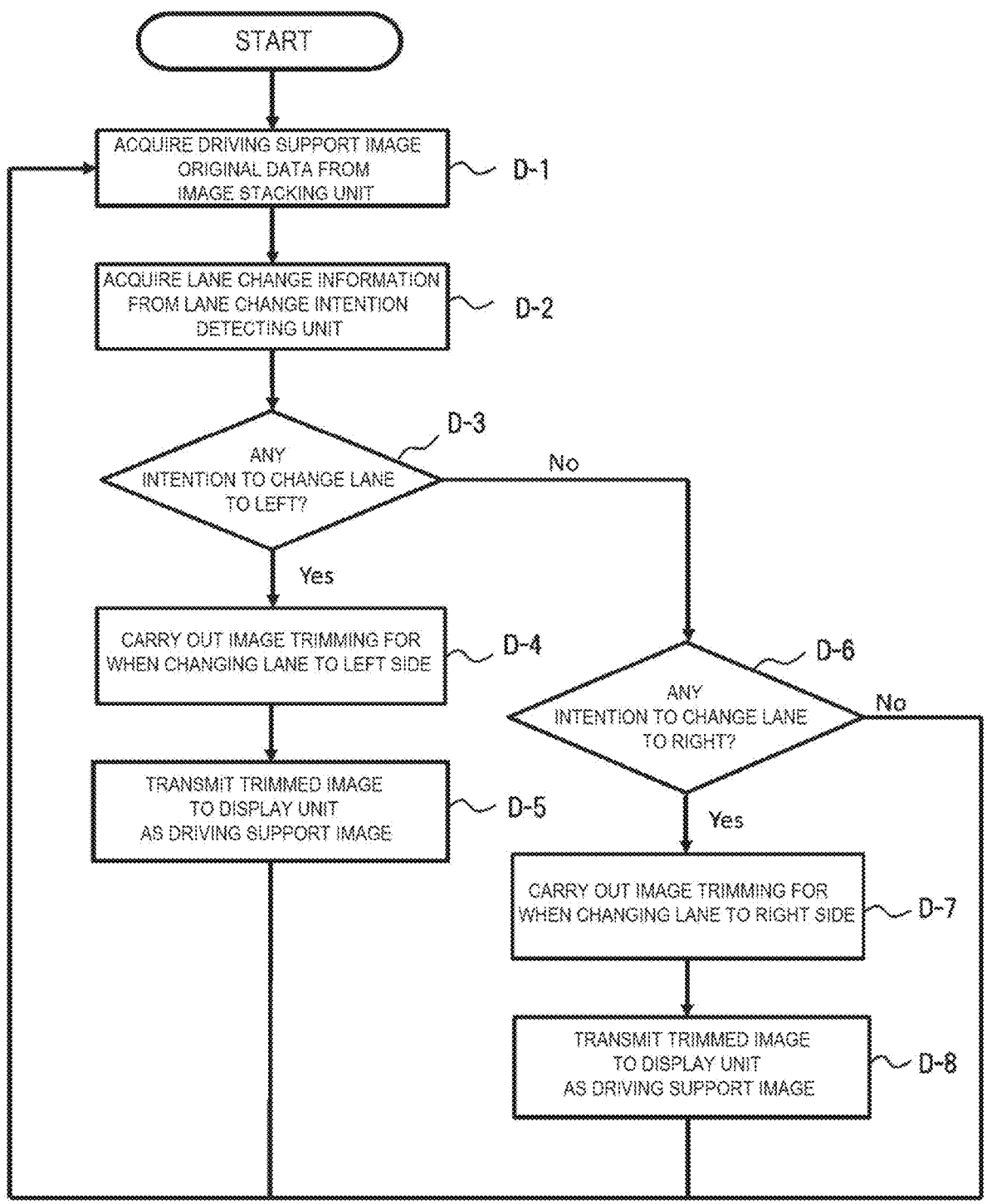
FIG. 8 is a flow diagram showing an operation of an image control unit that is a constituent component of the image generating unit.

FIG. 8 is a flow diagram showing an operation of the image control unit 21, and shows a flowchart of detecting an intention of the driver to change lane, cutting out original data of a driving support image based on the detected information, and transmitting the image information to the display unit 3.

Firstly, the image control unit 21 acquires original data of the driving support image 30 from the image stacking unit 20 (step D-1 (acquire driving support image original data from image stacking unit)).

Next, the image control unit 21 acquires lane change information indicating an intention of the driver to change lane from the lane change intention detecting unit 4 (step D-2 (acquire lane change information from lane change intention detecting unit)).

Next, the image control unit 21 analyzes the lane change information obtained, and determines whether or not the driver intends to change lane to the left-side lane (whether the driver intends to change lane to the right side, or whether the driver does not intend to change lane) (step D-3 (any intention to change lane to left?)).

When the driver intends to change lane to the left side (in the case of "Yes" in step D-3), the image control unit 21 cuts out only a region of the lane in which the own vehicle is traveling and the cruising lane neighboring on the left side from the acquired original data of the driving support image 30, thereby acquiring a driving support image showing only a necessary portion (an appropriate display range) to be displayed in the display unit 3 (step D-4 (carry out image trimming for when changing lane to left side)).

Next, the image control unit 21 transmits the driving support image after trimming to the display unit 3, that is, to the rear-view mirror display unit 31 and the side mirror display unit 32 on the left side of the vehicle, and causes the driving support image 30 to be displayed in the display unit 3 (step D-5 (transmit trimmed image to display unit as driving support image)).

Subsequently, the image control unit 21 returns to step D-1.

Herein, in the case of "No" in step D-3, the image control unit 21 determines, based on the lane change information, whether or not the driver intends to change lane to the right-side lane (whether the driver does not intend to change lane) (step D-6 (any intention to change lane to right?)).

When the driver intends to change lane to the right side (in the case of "Yes" in step D-6), the image control unit 21 cuts out only a region of the lane in which the own vehicle is traveling and the cruising lane neighboring on the right from the acquired image (step D-7 (carry out image trimming for when changing lane to right side)).

Next, the image control unit 21 transmits the trimmed image acquired in step D-7 to the rear-view mirror display unit 31 and the right side mirror display unit 32 (step D-8 (transmit trimmed image to display unit as driving support image)).

Subsequently, the image control unit 21 returns to step D-1, and repeats the operation flow.

When no intention of the driver to change lane is detected (in the case of "No" in step D-6), a state is such that no driving support image for changing lane is displayed in the display unit 3, and control is carried out so that no information unneeded by the driver is displayed in the display unit 3.

As heretofore described, a control of cutting out original data of the driving support image 30 based on lane change information obtained from the lane change intention detecting unit 4 is carried out by the image control unit 21 of the image generating unit 2.

As heretofore described, the lane change intention detecting unit 4, which detects an intention of the driver to change lane, is one portion of the constituent components of the driving support device 100, and is connected to the turn signal switch 41, which already exists in the vehicle, and the in-vehicle camera device 42 and driver sight line recognizing device 43, which already exist in the vehicle. The driver sight line recognizing device 43 is a device that recognizes the driver's sight line from an image of the driver filmed by the in-vehicle camera device 42. An output signal from the turn signal switch 41 or the driver sight line recognizing device 43 is transmitted as lane change information to the lane change intention detecting unit 4, and configured so that an intention of the driver to change lane is detected after analysis.

For example, when the turn signal switch 41 is operated, it is determined that there is an intention to attempt to change lane in the direction indicated by the turn signal switch 41, and also when it is recognized by the driver sight line recognizing device 43 that the driver's sight line is directed toward the side mirror 320, it is determined that there is an intention to change lane in the direction in which the sight line is directed, but provided that either one determination that, there is an intention to change lane has occurred, the driving support image 30 is displayed in the display unit 3.

Figure 9:
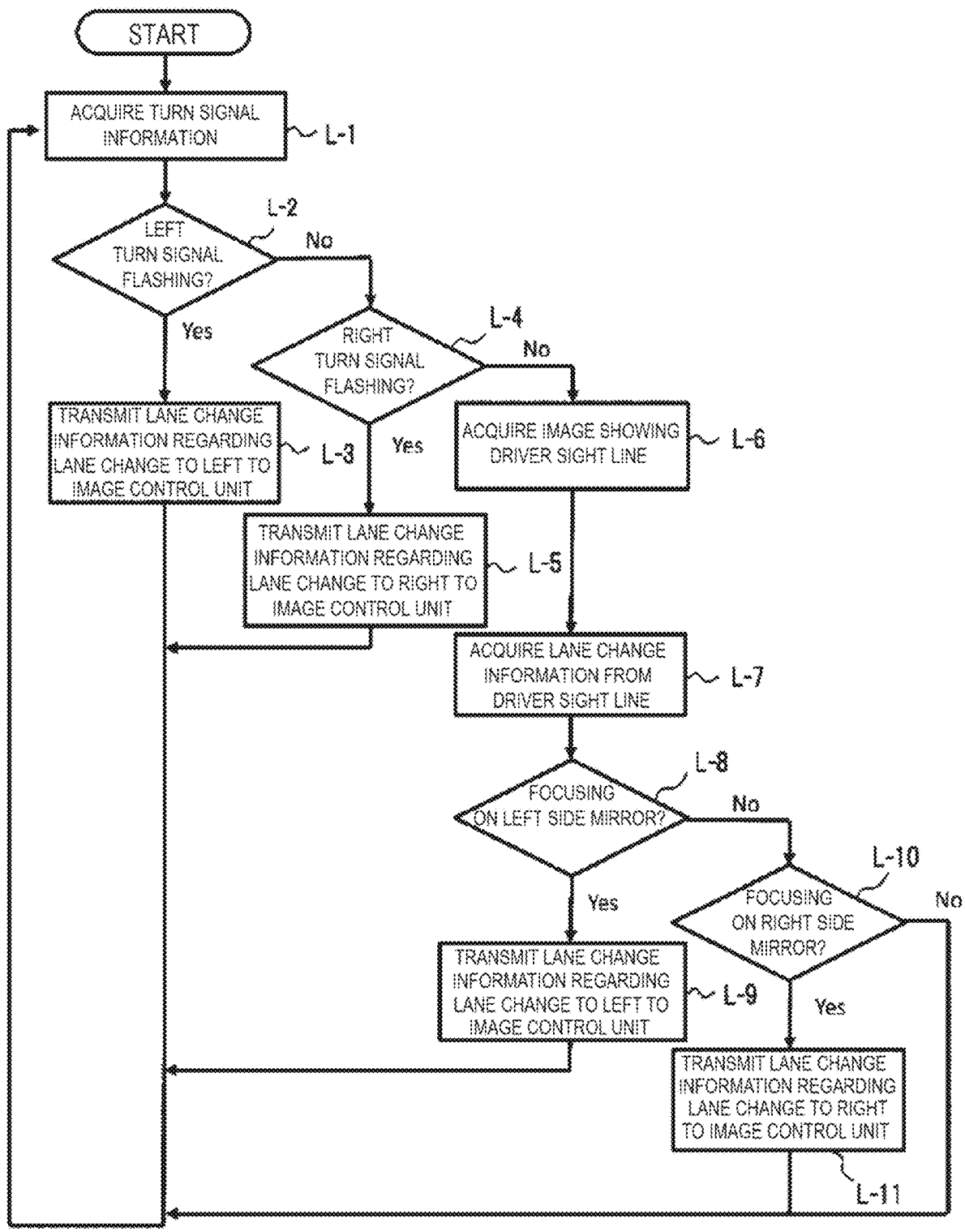
FIG. 9 is a flow diagram showing an operation of a lane change intention detecting unit.

FIG. 9 is a flow diagram showing an operation of the lane change intention detecting unit 4, and shows a flowchart of acquiring lane change information.

Firstly, the lane change intention detecting unit 4 acquires lane change information indicating an operating state of a turn signal from the turn signal switch 41 (step L-1 (acquire turn signal information)).

Next, the lane change intention detecting unit 4 determines whether or not the turn signal information obtained in step L-1 is a flashing of a left turn signal (whether the turn signal information is a flashing of a right turn signal, whether the turn signal information is that no turn signal is flashing) (step L-2 (left turn signal flashing?)).

When a flashing of the left turn signal is detected (in the case of "Yes" in step L-2), the lane change intention detecting unit 4 transmits lane change information to the effect that there is an intention to change lane to the left to the image control unit 21 (step L-3 (transmit lane change information regarding lane change to left to image control unit)).

Subsequently, the lane change intention detecting unit 4 returns to step L-1.

In the case of "No" in step L-2, the lane change intention detecting unit 4 determines whether or not the turn signal information obtained in step L-1 is a flashing of the right turn signal (whether the turn signal information is that no turn signal is flashing) (step L-4 (right turn signal flashing?)).

When a flashing of the right turn signal is detected (in the case of "Yes" in step L-4), the lane change intention detecting unit 4 transmits detected information. (lane change information) to the effect that there is an intention to change lane to the right to the image control unit 21 (step L-5 (transmit lane change information regarding lane change to right to image control unit)).

Subsequently, the lane change intention detecting unit 4 returns to step L-1.

When the turn signal switch 41 is not activated (in the case of "No" in step L-4), a shift is made to a flow detecting an intention to change lane using the driver sight line recognizing device 43. The driver sight line recognizing device 43 acquires an image showing in which direction the driver's sight line is directed from the in-vehicle camera device 42 (step L-6 (acquire image showing driver sight line)).

Next, the lane change intention detecting unit 4 acquires lane change information indicating the direction of the driver's sight line detected by the driver sight line recognizing device 43 based on the image of the driver acquired in step L-6 (step L-7 (acquire lane change information from driver sight line)).

When detecting that the driver has moved the sight line to either the left or right side mirror, the lane change intention detecting unit 4 determines that there is an intention to change lane in the relevant direction.

Subsequently, the lane change intention detecting unit 4 carries out a determination of whether or not the lane change information obtained from the driver sight line recognizing device 43 is information that the driver is focusing on the left side mirror whether the driver is focusing on the right side mirror, or whether the driver is not focusing on either side mirror) (step L-8 (focusing on left side mirror?)).

In the case of "Yes" in step L-8, that is, when there is information that the driver is focusing on the left side mirror, the lane change intention detecting unit 4 transmits lane change information to the effect that there is an intention to change lane to the left to the image control unit 21 (step L-9 (transmit lane change information regarding lane change to left to image control unit)).

Subsequently, the lane change intention detecting unit 4 returns to step L-1.

In the case of "No" in step L-8, the lane change intention detecting unit 4 carries out a determination of whether or not the driver is focusing on the right side mirror (whether the driver is not focusing on either side mirror) (step L-10 (focusing on right side mirror?))

In the case of "Yes" in step L-10, that is, when there is information that the driver is focusing on the right side mirror, the lane change intention detecting unit 4 transmits lane change information to the effect that there is an intention to change lane to the right to the image control unit 21 (step L-11 (transmit lane change information regarding lane change to right to image control unit)).

Subsequently, the lane change intention detecting unit 4 returns to step L-1.

In the case of "No" in step L-10 too, that is, when the driver is not focusing on either the right or left side mirror, the lane change intention detecting unit 4 returns to step L-1, and repeats the flow of the series of lane change intention detections.

An example wherein a vehicle image showing relative vehicle disposition information, a lane image showing a lane boundary line, and an image of a warning display are stacked is shown in the driving support image 30 shown in FIGS. 2 to 4, and no peripheral image based on peripheral image information is shown, but information regarding scenery such as a streetscape the driver is actually seeing on the outer sides of the cruising lane and a neighboring lane can be projected as an overhead view as the peripheral image. Therefore, by importing scenery on the outer sides of two lanes, and displaying the scenery in the driving support image 30 as a peripheral image, advantages are obtained in that a position in which the own vehicle is traveling and a position in which a peripheral vehicle is traveling can be ascertained in accordance with the scenery in a peripheral image including a landmark or the like, the positions in which the vehicles are traveling are easily recognized, and as the accuracy of the information displayed as the driving support image 30 is reinforced, a sense of security is obtained.

By the driving support device 100 being mounted in the vehicle in this way, confirmation of the situation when the driver changes lane can be carried out not only by checking behind using a visual recognition of a rear-view mirror and a side mirror, but also by a visual recognition of the driving support image 30 displayed in the display unit 3, because of which a lane change can be carried out more safely.

Furthermore, the driving support device 100 can be utilized as a safety steering system by being linked to a power steering system. For example, when a situation is such that a vehicle to beware of is traveling in a neighboring lane to which the driver is attempting to change, and changing lane in that direction is dangerous, safe driving can be supported by carrying out a control such that a power steering assisting function is deactivated when attempting to turn a steering wheel in the relevant direction, and the steering wheel becomes difficult to turn in the relevant direction.

Also, the finally obtained driving support image 30 is an image wherein multiple items of information are stacked, but when multiple items of information are positioned at the same coordinates, an image adjustment is carried out by the image generating unit 2 in accordance with an order of priority in displaying the items of information so that an item of information with high priority is displayed on top (on a surface). For example, a setting can be such that display is prioritized in the order of vehicle image, lane image, and peripheral image, and a warning image is given the highest priority.

Furthermore, the heretofore described example is such that a boundary line of the lane in which the own vehicle is traveling is recognized by the lane boundary recognizing device 25 from data filmed by the front camera device 26, whereby lane information is obtained, but not being limited to this, lane information regarding the road on which the own vehicle is travelling can also be acquired from an automotive navigation system already existing in the vehicle.

Also, it goes without saying that more accurate lane information can be obtained, and utilized in generating the driving support image 30, by collating data from both the lane boundary recognizing device 25 and the automotive navigation system.

Figure 10:
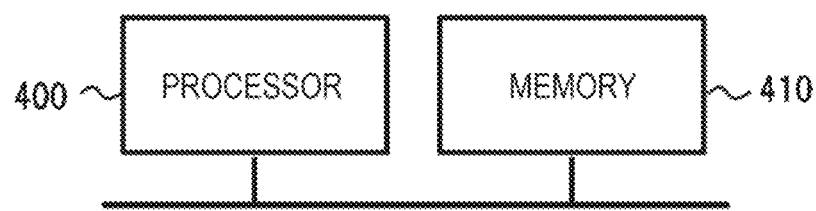
FIG. 10 is a drawing showing a hardware configuration of the driving support device.

Herein, as shown in a hardware configuration of the driving support device 100 in FIG. 10, the driving support device 100 includes a processor 400 and a memory 410 as hardware. Further, the memory 410 stores program that executes processes of the vehicle detecting unit 1, the image generating unit 2 (the image stacking unit 20 and the image control unit 21), and the lane change intention detecting unit 4. The program stored in the memory 410 is executed by the processor 400, and the driving support image 30 obtained is output to the display unit 3.

Although the present application is described in terms of an exemplifying embodiment, the various features, aspects, and functions described in the embodiment are not limited in their applicability to a specific embodiment, but instead can be applied, alone or in various combinations, to the embodiments.

It is therefore understood that numerous modifications that have not been exemplified can be devised without departing from the scope of the technology disclosed in the present application. For example, at least one constituent component may be modified, added, or eliminated.

1 vehicle detecting unit, 2 image generating unit, display unit, 4 lane change intention detecting unit, 10 own vehicle, 11 radar device, 12 peripheral camera device, 13 vehicle recognizing device, 14, 15, 16 peripheral vehicle, 15*a* turn signal display portion, 16*a* movement direction display portion, 25*a*, 25*b* lane boundary line, 20 image stacking unit, 21 image control unit, 22 peripheral image generating device, 23 road-to-vehicle communication device, 24 on-road monitoring camera, 25 lane boundary recognizing device, 26 front camera device, 30 driving support image, 31 rear-view mirror display unit, 32 side mirror display unit, 34 warning device, 35 warning display unit, 41 turn signal switch, 42 in-vehicle camera device, 43 driver sight line recognizing device, 100 driving support device, 310 rear-view mirror, 320 side mirror, 400 processor, 410 memory

What is claimed is:

1. A driving support device mounted in an own vehicle, the driving support device comprising:
   an in-vehicle camera that captures a driver image;
   at least one processor that detects peripheral vehicles positioned in a periphery of the own vehicle, and when a number of the peripheral vehicles positioned in the periphery of the own vehicle is greater than a preset number, generates an image representing dispositions of the own vehicle and the peripheral vehicles after excluding one or more peripheral vehicles having no collision possibility with the own vehicle, by trimming out from the image the one or more peripheral vehicles in an adjacent lane farther away from a lane to which the own vehicle intends to switch, based on lane change intention information of the own vehicle; and
   a display, provided in a place visually recognizable to a driver who drives the own vehicle, in which the image is displayed, wherein
   the at least one processor identifies, among the peripheral vehicles, a peripheral vehicle having a possibility of collision with the own vehicle, based on the driver image that shows the driver's line of sight, generates the image that includes vehicle information representing relative dispositions of the own vehicle and the peripheral vehicles using symbols indicating each of the own vehicle and the peripheral vehicles, and visually differentiates the symbol corresponding to the peripheral vehicle having the possibility of collision, from the symbols corresponding to the other peripheral vehicles.

2. The driving support device according to claim 1, further comprising:
   a peripheral camera configured to capture a first peripheral image of the own vehicle; and
   a communication interface configured to receive a second peripheral image of the own vehicle from an on-road monitoring camera,
   wherein the at least one processor generates the image by converting the first peripheral image and the second peripheral image into a first overhead image and a second overhead image that are centered on the own vehicle, respectively, and synthesizing the first peripheral image and the second peripheral image to the image to be presented on the display of the own vehicle.

3. The driving support device according to claim 1, wherein, of the symbols indicating the peripheral vehicles, the symbol indicating a vehicle to beware of that is nearing the vehicle is displayed accentuated more than the other symbols in the image generated by the at least one processor.

4. The driving support device according to claim 1, wherein, of the peripheral vehicles, a vehicle to beware of that is nearing the own vehicle is displayed as the symbol in the image generated by the at least one processor, and the peripheral vehicles other than the vehicle to beware of are not displayed.

5. The driving support device according to claim 3, wherein the at least one processor generates the image to include warning information indicating a warning to the driver when the vehicle to beware of exists among the peripheral vehicles.

6. The driving support device according to claim 3, wherein the at least one processor outputs a signal causing a sound indicating a warning to the driver to be emitted to an exterior when the vehicle to beware of exists among the peripheral vehicles.

7. The driving support device according to claim 3, wherein the at least one processor generates the image to include movement direction information indicating a relative direction of movement of the peripheral vehicle to beware of with respect to the own vehicle.

8. The driving support device according to claim 1, wherein the at least one processor generates the image to include lane information representing a boundary line between a lane in which the own vehicle is traveling and a lane neighboring the lane in which the peripheral vehicle is traveling in a region detected by the at least one processor.

9. The driving support device according to claim 1, wherein the at least one processor generates the image to include information obtained from the in-vehicle camera mounted in the own vehicle or a camera installed on a road.

10. The driving support device according to claim 1, wherein the at least one processor detects colors of bodies of the peripheral vehicles, and the at least one processor generates the image to include the symbols wherein information regarding the colors of the bodies of the peripheral vehicles obtained by the at least one processor is reflected.

11. The driving support device according to claim 1, wherein the at least one processor detects a turn signal display state of the peripheral vehicles, and the at least one processor generates the image to include the turn signal display information obtained by the at least one processor.

12. The driving support device according to claim 1, wherein, when either a left or a right turn signal switch of the own vehicle is activated, the at least one processor determines that an intention to change lane in the relevant direction is being indicated.

13. The driving support device according to claim 1, wherein, when detecting that the driver has moved a sight line to either a left or a right side mirror of the vehicle, the at least one processor determines that an intention to change lane in the relevant direction is being indicated.

14. The driving support device according to claim 1, wherein the display is provided in a mirror face portion of a rear-view mirror or a side mirror of the vehicle.

* * * * *